United States Patent
Percival et al.

(10) Patent No.: US 11,381,716 B2
(45) Date of Patent: Jul. 5, 2022

(54) CAMERA WITH A HOUSING, A CIRCUIT BOARD AND A HOOD-LIKE, RESILIENT RETAINING ELEMENT, MOTOR VEHICLE AND METHOD FOR ASSEMBLING A CAMERA

(71) Applicant: Connaught Electronics Ltd., Tuam (IE)

(72) Inventors: Simon Percival, Tuam (IE); Sean Mcfadden, Tuam (IE)

(73) Assignee: Connaught Electronics Ltd., Tuam (IE)

( * ) Notice: Subject to any disclaimer, the term of this patent is extended or adjusted under 35 U.S.C. 154(b) by 897 days.

(21) Appl. No.: 16/081,250

(22) PCT Filed: Mar. 2, 2017

(86) PCT No.: PCT/EP2017/054902
§ 371 (c)(1),
(2) Date: Aug. 30, 2018

(87) PCT Pub. No.: WO2017/149075
PCT Pub. Date: Sep. 8, 2017

(65) Prior Publication Data
US 2020/0169648 A1    May 28, 2020

(30) Foreign Application Priority Data

Mar. 4, 2016   (DE) ..................... 10 2016 103 965.9

(51) Int. Cl.
*H04N 5/228*    (2006.01)
*H04N 5/225*    (2006.01)
(Continued)

(52) U.S. Cl.
CPC ........... *H04N 5/2252* (2013.01); *B60R 11/04* (2013.01); *H04N 5/2257* (2013.01); *B60R 2011/004* (2013.01)

(58) Field of Classification Search
CPC .. H04N 5/2252; H04N 5/2257; H04N 5/2253; H04N 5/2254; H04N 5/228; B60R 11/04; B60R 2011/004
See application file for complete search history.

(56) References Cited

U.S. PATENT DOCUMENTS

| | | | |
|---|---|---|---|
| 2011/0122267 A1* | 5/2011 | Ahn ......................... | G03B 5/00 348/208.7 |
| 2014/0320657 A1 | 10/2014 | Han et al. | |

(Continued)

FOREIGN PATENT DOCUMENTS

| | | |
|---|---|---|
| DE | 698 05 236 T2 | 8/2002 |
| DE | 10 2014 212016 A1 | 12/2015 |

(Continued)

OTHER PUBLICATIONS

International Search Report issued in PCT/EP2017/054902 dated May 10, 2017 (3 pages).

(Continued)

*Primary Examiner* — Patrick E Demosky
(74) *Attorney, Agent, or Firm* — Osha Bergman Watanabe & Burton LLP (57) ABSTRACT

The invention relates to a camera (2) for a motor vehicle (1), including a housing (8) and a circuit board (9) and a retaining element (12), by which the circuit board (9) is retained in the housing (8), wherein the retaining element (12) has a first retaining flap (16) resilient in the direction perpendicular to a longitudinal axis (15) of the housing (8) and a second retaining flap (17) resilient in the direction perpendicular to the longitudinal axis (15), which engage with opposing border sides (20, 21) of the first circuit board (Continued)

(9), wherein the first retaining flap (16) is pressed to a first border side (20) of the first circuit board (9) by an inner side (28) of a first sidewall (24) of the housing (8) in perpendicular direction to the longitudinal axis (15) in the assembled final state of the camera (2), and the second retaining flap (17) is pressed to a second border side (21) of the first circuit board (9) by an inner side (29) of a second sidewall (25) of the housing (8) in perpendicular direction to the longitudinal axis (15) in the assembled final state of the camera (2).

13 Claims, 12 Drawing Sheets

(51) Int. Cl.
*B60R 11/04* (2006.01)
*B60R 11/00* (2006.01)

(56) References Cited

U.S. PATENT DOCUMENTS

| | | |
|---|---|---|
| 2015/0146094 A1 | 5/2015 | Seger et al. |
| 2015/0195459 A1* | 7/2015 | Yeo .................. G02B 7/023 |
| | | 348/208.2 |

FOREIGN PATENT DOCUMENTS

| | | |
|---|---|---|
| EP | 2 651 115 A2 | 10/2013 |
| WO | 2011/082715 A1 | 7/2011 |
| WO | 2013/069866 A1 | 5/2013 |

OTHER PUBLICATIONS

Written Opinion of the International Searching Authority issued in PCT/EP2017/054902 dated May 10, 2017 (7 pages).
German Search Report issued in DE 10 2016 103 965.9 dated Dec. 22, 2016 (5 pages).

* cited by examiner

CAMERA WITH A HOUSING, A CIRCUIT BOARD AND A HOOD-LIKE, RESILIENT RETAINING ELEMENT, MOTOR VEHICLE AND METHOD FOR ASSEMBLING A CAMERA

The invention relates to a camera for a motor vehicle including a housing, a circuit board and a retaining element. The circuit board is retained in the housing by the retaining element. The invention also relates to a motor vehicle with a corresponding camera. Furthermore, the invention relates to a method for assembling a camera, in which a circuit board of the camera is retained in a housing of the camera by a retaining element of the camera.

Cameras for a motor vehicle with a housing, a circuit board and a retaining element are known from the prior art. Thus, US 2014/0320657 A1 shows a camera module for a vehicle. The camera module includes a first circuit board, a second circuit board and an exterior shield to shield the first and the second circuit board with respect to electromagnetic influences. The exterior shield has a plurality of bearing units for bearing the first and the second circuit board.

It is the object of the invention to provide a camera as well as a method for assembling a camera, in which or by which the exact positional transfer of a circuit board of the camera can be simpler effected.

According to the invention, this object is solved by a camera, by a motor vehicle as well as by a method for assembling a camera having the features according to the respective independent claims.

A camera according to the invention for a motor vehicle includes a housing, a circuit board and a retaining element. The circuit board is retained in the housing by the retaining element. As an essential idea of the invention, it is provided that the retaining element has a first retaining flap resilient in the direction perpendicular to a longitudinal axis of the housing and a second retaining flap resilient in the direction perpendicular to the longitudinal axis, which engage with opposing border sides of the first circuit board. The first retaining flap is pressed to a first border side of the first circuit board by an inner side of a first sidewall of the housing in perpendicular direction to the longitudinal axis in the assembled final state of the camera. The second retaining flap is pressed to a second border side of the first circuit board by an inner side of a second sidewall of the housing in perpendicular direction to the longitudinal axis in the assembled final state of the camera.

The invention is based on the realization that the in particular rigid sidewalls of the housing can be used to apply a force to the retaining flap of the retaining element to fix the circuit board in a defined axial position viewed in the direction of the longitudinal axis. The positionally exact arrangement of the circuit board in the housing of the camera can thereby be simpler achieved.

In particular, by pressing the retaining flaps to the border sides, clamping of the first circuit board in the retaining element is formed. Thereby, the first circuit board is fixed in a defined axial position viewed in the direction of the longitudinal axis.

In that the first retaining flap is pressed by the first sidewall and the second retaining flap is pressed by the second sidewall in the direction of the longitudinal axis, thus in particular they are pressed in opposite directions, the first circuit board is clamped between the retaining flaps with a clamping force acting perpendicularly to the longitudinal axis, and fixed at least relative to the retaining element. Since the retaining element is clamped in the housing and thereby is fixed relative to the housing, the first circuit board is also fixed relative to the housing.

For example, an image sensor of the camera can be disposed on the first circuit board. By fixing the first circuit board depending on the retaining element with the retaining flaps, a distance between the image sensor and a lens of the camera can be reliably and permanently maintained.

Preferably, it is provided that the retaining element has a third retaining flap resilient in the direction perpendicular to the longitudinal axis and a fourth retaining flap resilient in the direction perpendicular to the longitudinal axis, which engage with opposing border sides of the first circuit board, wherein the third retaining flap is pressed to a third border side of the first circuit board by an inner side of a third sidewall of the housing in perpendicular direction to the longitudinal axis in the assembled final state of the camera, and the fourth retaining flap is pressed to a fourth border side of the first circuit board by an inner side of a fourth sidewall of the housing in perpendicular direction to the longitudinal axis in the assembled final state of the camera. The third retaining flap and the fourth retaining flap in particular engage with opposing border sides of the first circuit board, wherein the third retaining flap is preferably rotated by 90° around the longitudinal axis with respect to the first retaining flap and the fourth retaining flap is preferably rotated by 90° around the longitudinal axis with respect to the second retaining flap. Thereby, more reliable fixation of the first circuit board in axial direction is also achieved since the first circuit board now is not retained only by two retaining flaps anymore, but by four retaining flaps.

Furthermore, it is preferably provided that the first retaining flap has a first retaining flap part and a second retaining flap part and/or the second retaining flap has a first retaining flap part and a second retaining flap part, wherein the two retaining flap parts of a respective retaining flap join to each other at an angle, in particular at a right angle. Preferably, the first retaining flap and/or the second retaining flap are L-shaped formed. The first retaining flap part is in particular oriented perpendicularly to the longitudinal axis, while the second retaining flap part is in particular oriented in the direction of the longitudinal axis. By the arrangement of the retaining flap parts at the angle, the resilience of the respective retaining flap can be effected in controlled manner such that the pressing forces do not act too abruptly and/or too severely on the first circuit board in the assembly.

Furthermore, it is preferably provided that the entire retaining element is formed integrally, in particular hood-like, in particular with at least the first retaining flap and the second retaining flap. Thus, the retaining element can for example be integrally formed of spring steel. By the hood-like formation, the retaining element can receive and retain at least two circuit boards. However, the formation of the retaining element can also be described as pot-shaped or bell-shaped. By the hood-like formation of the retaining element, the first circuit board can also be protected from an accumulation of dust particles on the first circuit board. Furthermore, the first circuit board can for example be protected from electromagnetic radiation from the outside of the retaining element by the hood-like configuration of the retaining element. Thus, by the hood-like retaining element, a protective shield with respect to electromagnetic radiation is provided by the retaining element for the first circuit board at least on five of six spatial sides.

Furthermore, it is preferably provided that the respective retaining flap has a coupling tongue for coupling to the first circuit board in a coupling area of a second retaining flap part of the respective retaining flap. The coupling area is in particular disposed at the retaining flap where the retaining flap is in contact with the respective border side of the first circuit board, while the respective retaining flap is pressed to the respective border side of the circuit board in the assembled final state. By the coupling tongue, the first circuit board can be more fixedly retained and the camera can be more reliably operated.

In an embodiment, it can be provided that the coupling tongue has at least an inner knob, which faces the first circuit board, and/or the coupling tongue has an outer knob, which faces the respective inner side of the respective sidewall of the housing. By the inner knob, the contact of the respective retaining flap with the first circuit board can be more fixedly and precisely effected. The contact between the inner knob and the first circuit board can for example be perfectly precisely effected. By the outer knob, the contact of the respective retaining flap with the respective sidewall of the housing can be more accurately determined. Thus, by the outer knob, it can be in particular perfectly precisely determined, on which location of the respective sidewall the coupling tongue abuts. For example, ramps can then be attached to the respective sidewall of the housing to come into contact with the outer knob. The coupling tongue can also have a further inner knob. By the further inner knob, the first circuit board can again be more fixedly retained than if the first circuit board is only retained by a single inner knob.

In a further embodiment, it can be provided that the coupling tongue includes a first partial coupling tongue with the outer knob and at least a second partial coupling tongue with the inner knob spaced thereto. This is advantageous in that the coupling tongue thereby can spring in different directions perpendicular to the longitudinal axis. Thus, the first partial coupling tongue with the outer knob is for example pressed in the direction of the longitudinal axis by the respective sidewall, while the second partial coupling tongue with the inner knob is pressed away from the longitudinal axis by the first circuit board. Thus, by the division of the coupling tongue, thus by the first partial coupling tongue and the second partial coupling tongue, a tolerance range in retaining the first circuit board is provided. If the first partial coupling tongue with the outer knob is for example pressed too far in the direction of the circuit board, thus, the distance pressed too far can be compensated for by yielding of the second partial coupling tongue with the inner knob in the direction of the side facing away perpendicularly to the longitudinal axis. It can also be provided that the coupling tongue includes a further second partial coupling tongue with a further inner knob. Then, both second partial coupling tongues can spring away from the first circuit board.

Furthermore, it is preferably provided that the coupling tongue is shorter than an overall width of the retaining flap extending in a plane perpendicular to the longitudinal axis, in particular the coupling zone is disposed centrally in the middle at the retaining flap. In that the coupling tongue is shorter than the entire width of the retaining flap, the respective retaining flap can be guided past besides bearing pedestals on a bottom of the housing for example in merging housing and retaining element. By the central arrangement of the coupling tongue in the middle, for example, the respective retaining flap can be disposed in the housing such that a bearing pedestal is on the bottom of the housing at each end of the shortened coupling tongue.

Furthermore, it is preferably provided that a second retaining flap part of the respective retaining flap has an in particular continuous recess for the arrangement of a second circuit board of the camera in an area between a transition from a first retaining flap part of the respective retaining flap to the second retaining flap part and the coupling tongue of the respective retaining flap. The transition is in particular locally determined by the kink of the respective retaining flap between the first retaining flap part and the second retaining flap part. Between the transition and the coupling tongue, preferably, the recess is disposed. The recess is in particular continuous. By the recess, the second circuit board can be received and retained. Preferably, each of the retaining flaps respectively has the recess and the second circuit board is thereby reliably fixed. While the first circuit board is retained by the pressure of the respective sidewall on the respective lateral flap, the second circuit board is in particular retained by inserting into the respective recess. The insertion into the recess is for example allowed in that the respective retaining flaps are temporally bent away from the longitudinal axis for the procedure of inserting the second circuit board. At least one clamp resilient in particular in axial direction can also be disposed on the recess to fix or fixedly clamp the second circuit board to the retaining element.

Furthermore, it is preferably provided that the second circuit board has a socket element for arrangement in the recess in particular centrally on at least one border side. The circuit board can be fixed in a defined axial position in the direction of the longitudinal axis in the retaining element by the socket element. For this purpose, the second circuit board preferably has multiple socket elements. The socket elements are then inserted into the recesses in assembly. Thus, at least in the direction of the longitudinal axis, a form-fit connection between the second circuit board and the retaining element in the direction of the longitudinal axis is provided. Thereby, the second circuit board is reliably disposed on the retaining element in particular without backlash in the direction of the longitudinal axis.

Furthermore, it is preferably provided that a roof of the retaining element formed for covering the at least first circuit board is formed by at least a first retaining flap part of the first retaining flap and a first retaining flap part of the second retaining flap. By the roof of the retaining element, the retaining flaps are connected to each other and can be passed together around the first circuit board for receiving it. Furthermore, in the roof of the retaining element, an opening for passing an interface unit of the camera can be formed.

Thereby, the retaining element can allow passage of the interface unit for example disposed on the second circuit board. By the roof, the first circuit board and/or the second circuit board can also be protected, and a seal of the housing of the camera can for example be omitted. Furthermore, the roof for example serves for electromagnetically shielding at least the first circuit board.

In a further embodiment, it can in particular be provided that on an inner side of a respective sidewall of the housing, a ramp raised with respect to a main inner surface of the sidewall is formed, in particular the ramp has a lead-in surface, which is directed away from a bottom of the housing in tapering manner. By the ramp, the respective retaining flap is more reliably and accurately pressed towards the respective border side of the first circuit board. By the lead-in surface, the outer knob of the coupling tongue of the respective retaining flap is in particular lead onto the ramp and thereby then pressed to the respective border side of the first circuit board. The ramp also serves for being able to introduce the retaining element into the housing without cant, and in particular the respective retaining flap is pressed to the border side of the first circuit board only with contact of the outer knob with the ramp.

In a further embodiment, it is preferably provided that on a bottom of the housing, in particular in a corner area of the bottom, a bearing pedestal for bearing the first circuit board is formed. By the bearing pedestal, a distance from the first circuit board disposed in the final state to the lens of the camera can be precisely provided. For example, this can be of importance since an image sensor of the camera can be disposed on the first circuit board. The distance of the image sensor to the lens is usually preset as invariable in the camera present in the assembled final state. Thereby, the camera can thus be particularly reliably provided. Preferably, multiple bearing pedestals are formed on the bottom of the housing. Thus, the bottom for example has four corner areas such that a respective bearing pedestal is preferably disposed in each of the corner areas. In that the coupling tongue is formed shorter than the entire width of the retaining flap extending in the plane perpendicular to the longitudinal axis, the retaining element can be guided past the bearing pedestal along the longitudinal axis in the direction of the lens of the camera.

In particular, the camera has a motor vehicle fixing element for fixing to the motor vehicle.

The invention also relates to a motor vehicle with a camera according to the invention. The motor vehicle can for example include a driver assistance system with the camera.

The driver assistance system can for example be formed as an environmental vision system (CMS—camera monitoring system).

Furthermore, the invention also relates to a method for assembling a camera according to the invention. Herein, a circuit board of the camera is retained in a housing of the camera by a retaining element of the camera. As an essential idea of the invention, it is provided that a first retaining flap and a second retaining flap of the retaining element spring in a direction perpendicular to a longitudinal axis of the housing in passing the retaining element and the housing into each other. Opposing border sides of the first circuit board are engaged by the resilient retaining flaps. In this passing into each other, the first retaining flap is pressed to a first border side of the first circuit board by an inner side of the first sidewall of the housing in perpendicular direction to the longitudinal axis. The second retaining flap is pressed to a second border side of the first circuit board by an inner side of a second sidewall of the housing in perpendicular direction to the longitudinal axis in the assembled state of the camera.

By the method according to the invention, the camera can be faster assembled and less parts are required, wherefore the camera can be more inexpensively and simpler manufactured. Thus, due to the retaining element, screws are for example not required to dispose the first circuit board in the housing. Thereby, less selective force is for example delivered to the first circuit board, whereby the first circuit board can then be more durably formed. In addition, the risk of sheared off screws is reduced, in particular completely excluded.

Further advantages of the method according to the invention are that a more compact camera, a more effective electromagnetic shielding of the camera, a faster assembly of the camera, a higher robustness of the camera, a reduced material list of the camera and more inexpensive assembly cost of the camera are thereby allowed.

The preferred embodiments presented with respect to the camera according to the invention and the advantages thereof correspondingly apply to the motor vehicle according to the invention as well as to the method according to the invention.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not have all of the features of an originally formulated independent claim. Moreover, implementations and feature combinations are also to be considered as disclosed, in particular by the explanations set out above, which extend beyond or deviate from the feature combinations set out in the relations of the claims.

Below, the embodiments of the invention are explained in more detail based on schematic drawings.

There show.

In the figures, identical or functionally identical elements are provided with the same reference characters.

Figure 1:
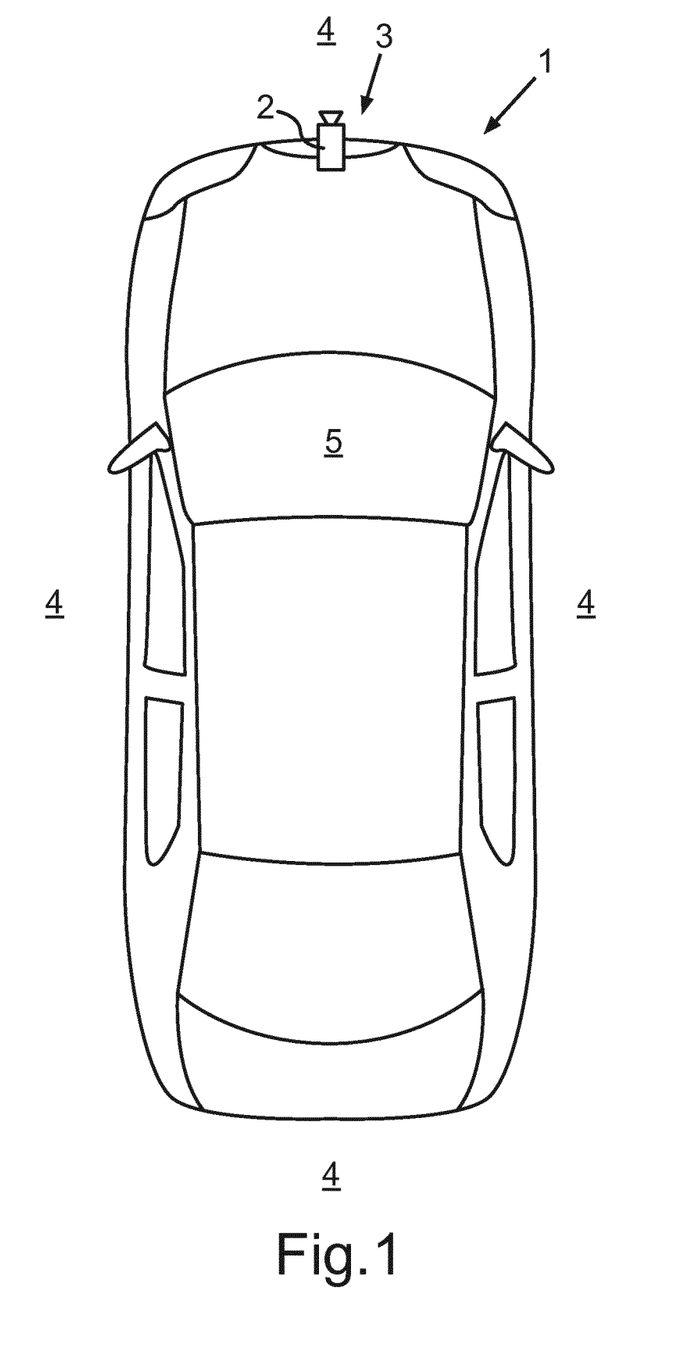
FIG. 1 a schematic plan view of an embodiment of a motor vehicle according to the invention with a camera.

In FIG. 1, a plan view of a motor vehicle 1 with a camera 2 is schematically illustrated. According to the embodiment, the camera 2 is disposed on a front 3 of the motor vehicle 1. However, the arrangement of the camera 2 is variously possible, however, preferably such that an environmental region 4 of the motor vehicle 1 and/or an interior 5 of the motor vehicle 1 can at least partially be captured.

The camera 2 can be formed as a CMOS (complementary metal-oxide-semiconductor) camera or else as a CCD (charge-coupled device) camera or else as any image capturing device. The camera 2 is in particular formed as a video camera, which continuously provides an image sequence of frames.

Figure 2:
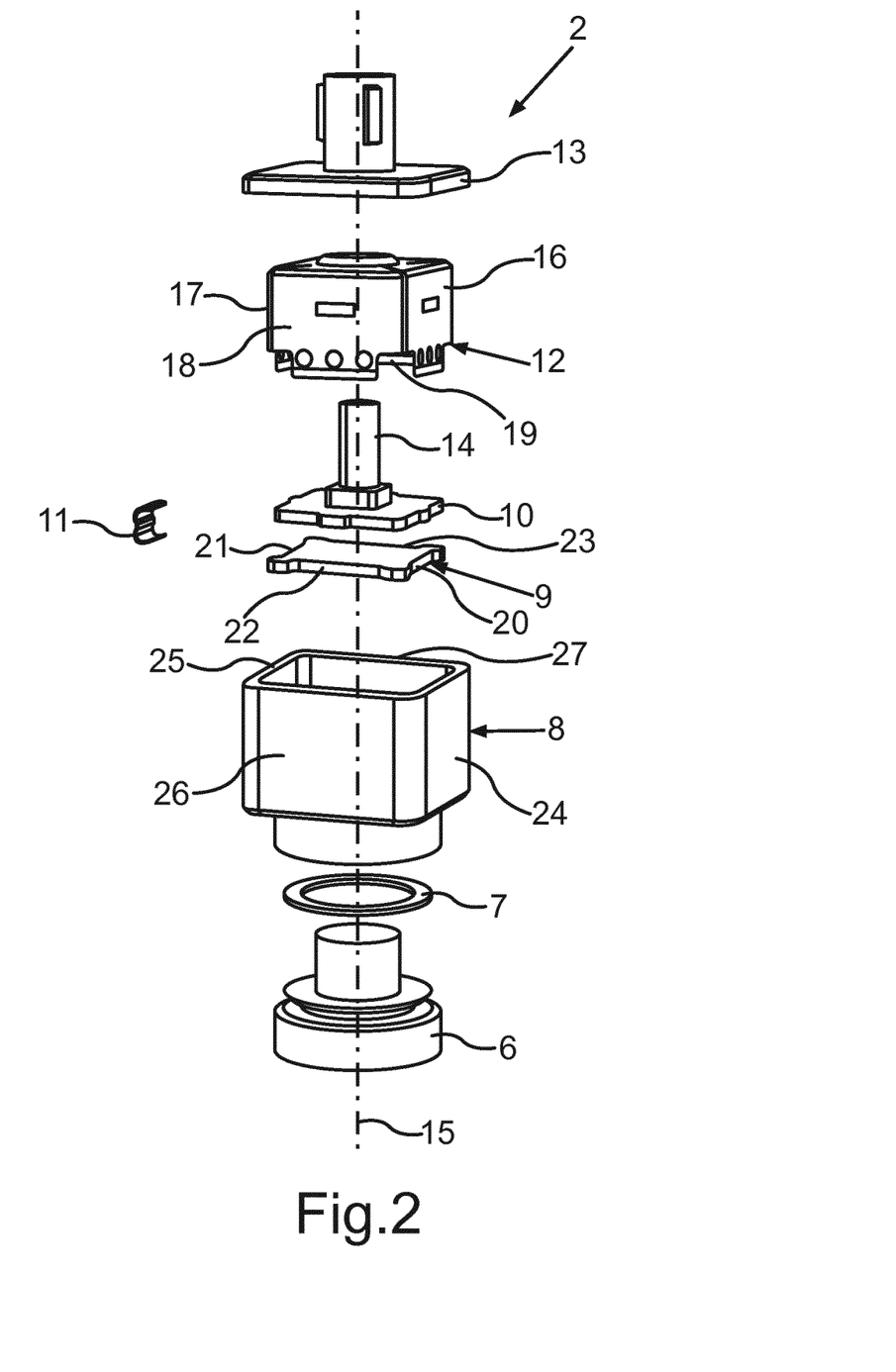
FIG. 2 a schematic exploded representation of the camera with a retaining element.

FIG. 2 shows an exploded representation of the camera 2. The camera 2 includes a lens 6, a lens sealing ring 7, a housing 8, a first circuit board 9, a second circuit board 10, an electrical connecting element 11, a retaining element 12 and a housing lid 13. Furthermore, an electronic interface unit 14, for example a coaxial plug, for connecting to the motor vehicle 1 is disposed on the second circuit board 10. At a side of the first circuit board 9 facing the lens 6, an image sensor of the camera 2 not further illustrated is preferably disposed.

The lens sealing ring 7 is formed to prevent penetration of liquid between the lens 6 and the housing 8. The electrical connecting element 11 is formed to transfer electrical signals between the first circuit board 9 and the second circuit board 10. The electrical connecting element 11 is connected to the first circuit board 9 and the second circuit board 10. Furthermore, the electrical connecting element 11 can be formed flexibly as FPC (flexible printed circuit) or partially flexibly or rigidly.

The housing 8 has a longitudinal axis 15. The retaining element 12 has a first retaining flap 16 resilient in the direction perpendicular to the longitudinal axis 15 and a second retaining flap 17 resilient in the direction perpendicular to the longitudinal axis 15. Furthermore, the retaining element 12 has a third retaining flap 18 resilient in the direction perpendicular to the longitudinal axis 15 and opposing a fourth retaining flap 19 resilient in the direction perpendicular to the longitudinal axis 15.

The first circuit board 9 has a first border side 20, a second border side 21, a third border side 22 and a fourth border side 23. The housing 8 has a first sidewall 24, a second sidewall 25, a third sidewall 26 and a fourth sidewall 27. The first sidewall 24 and the second sidewall 25 are opposing each other. Furthermore, the third sidewall 26 and the fourth sidewall 27 are opposing each other.

Figure 3:
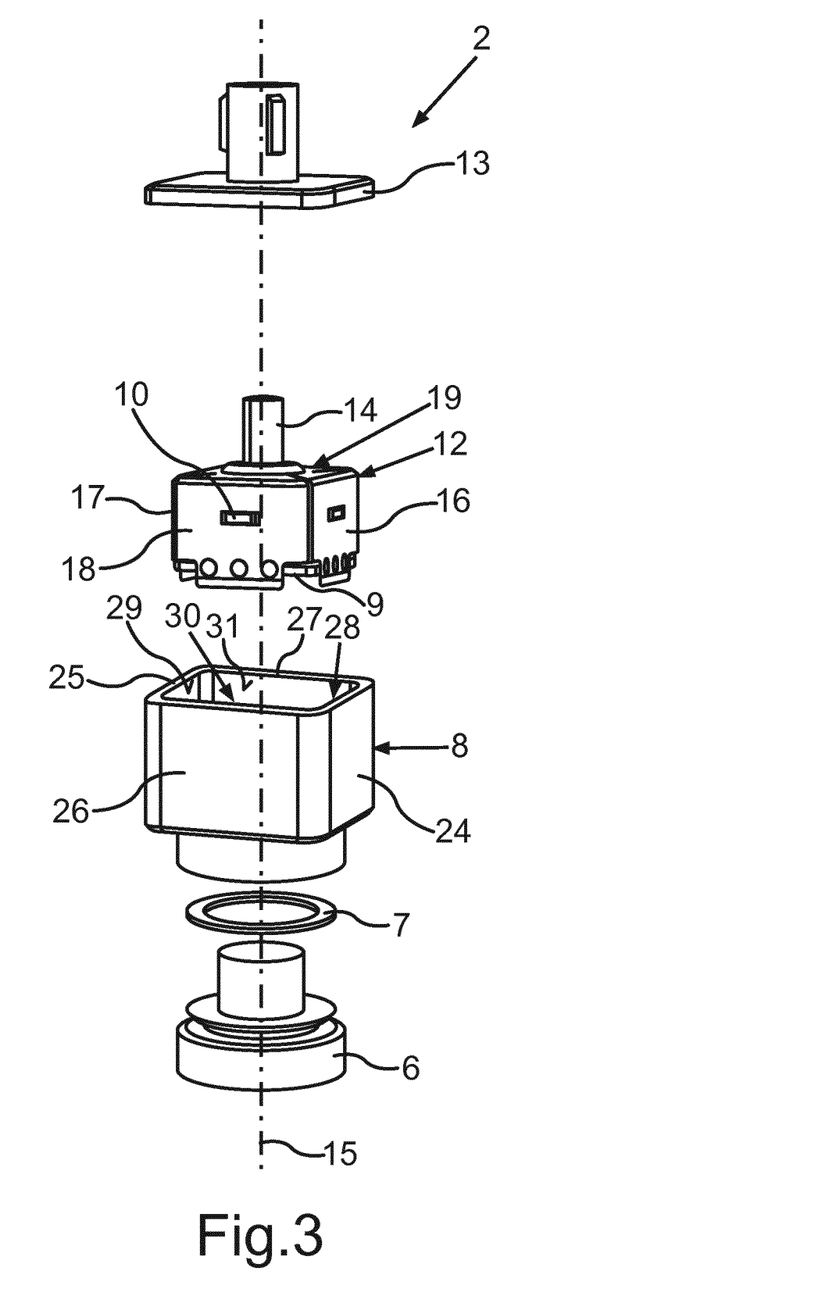
FIG. 3 a further schematic exploded representation of the camera with a first circuit board disposed in the retaining element.
Figure 6:
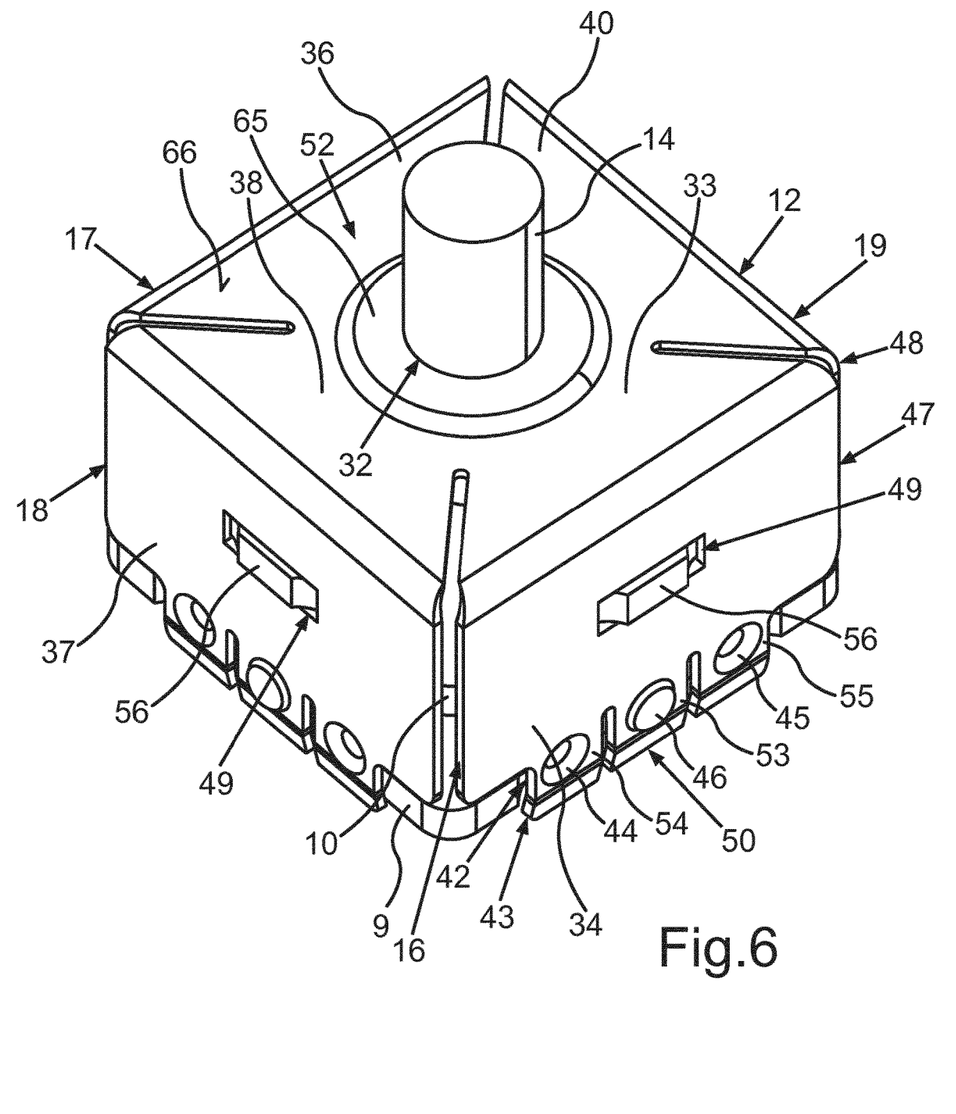
FIG. 6 a further schematic illustration of the retaining element, wherein a first partial coupling tongue of a coupling tongue of the respective retaining flap is formed with an outer knob and a second partial coupling tongue of the coupling tongue is formed with an inner knob.

FIG. 3 shows a further exploded representation of the camera 2 analogously to FIG. 2. The first circuit board 9 and the second circuit board 10 are disposed in the retaining element 12. The first circuit board 9 is preferably disposed in a pre-clamping position in the retaining element 12, by which a preliminary fixation of the first circuit board 9 in the direction of the longitudinal axis 15 is effected. As shown in FIG. 6—the second circuit board 10 is fixed in form-fit manner in the direction of the longitudinal axis 15 in the retaining element 12 in particular by webs or socket elements of the second circuit board 10. In axially introducing the retaining element 12 into the housing 8, the first retaining flap 16 is then pressed to the first border side 20 by an inner side 28 of the first sidewall 24 in perpendicular direction to the longitudinal axis 15. The second retaining flap 17 is pressed to the second border side 21 by an inner side 29 of the second sidewall 25 in perpendicular direction to the longitudinal axis 15. The third retaining flap 18 is pressed to the third border side 22 by an inner side 30 of the third sidewall 26. The fourth retaining flap 19 is pressed to the fourth border side 23 by an inner side 31 of the fourth sidewall 27.

Figure 4:
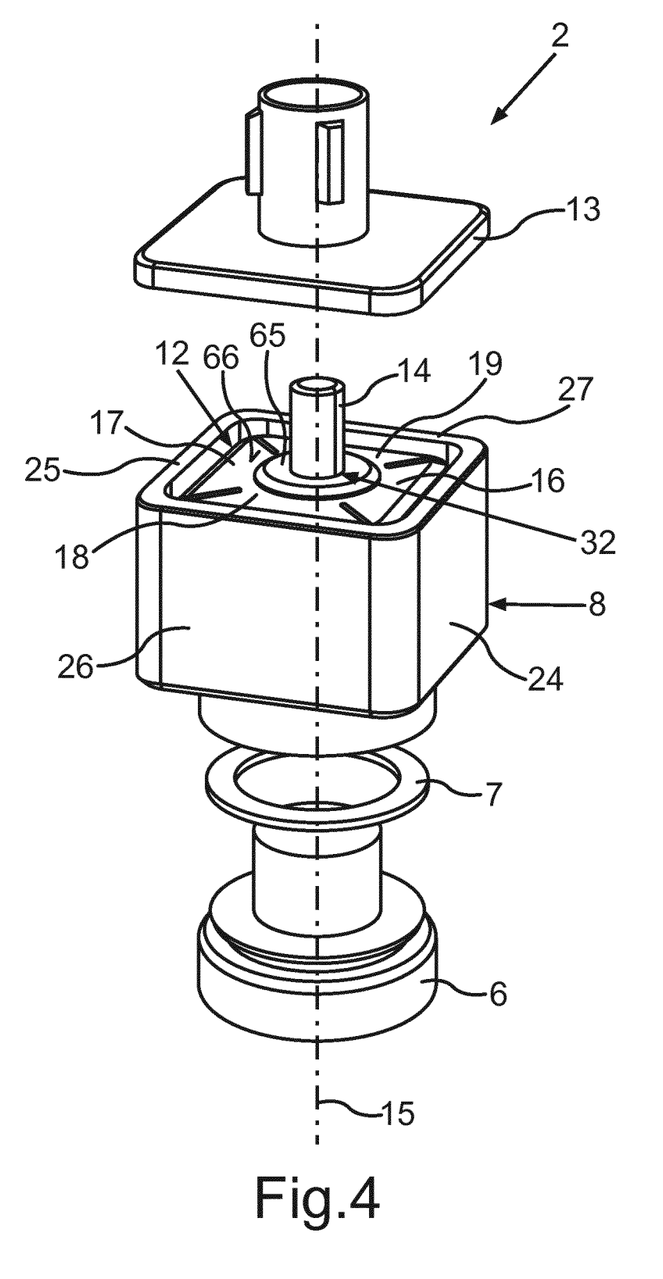
FIG. 4 a further schematic exploded representation of the camera with the retaining element disposed in a housing of the camera.

FIG. 4 shows a further exploded representation of the camera 2 in analogous manner to FIG. 1 and FIG. 2, wherein the retaining element 12 is completely disposed in the housing 8 together with the first circuit board 9 and the second circuit board 10. The retaining element 12 has a central opening 32, through which the interface unit 14 axially extends in the assembled final state of the camera 2.

The retaining element 12 has an opening edging element 65 which is circumferential around the opening 32 and has a circular outer contour. The opening edging element 65 is raised relative to a surface 66 of the retaining element 12, which faces the housing lid 13. Thus, during assembly of the camera 2 the retaining element 12 first contacts the housing lid 13 via the opening edging element 65. In particular, in the assembled final state the retaining element 12 is contacted by the housing lid 13 only via the opening edging element 65. In the assembled final state, an axial force is permanently exerted by the housing lid 13 on the opening edging element 65. In the area of the opening edging element 65 the retaining element 12 is thus axially pressed in the direction of the circuit boards 9, 10, whereby the entire retaining element 12 is permanently pressed in the direction of the circuit boards 9, 10. In particular, the first circuit board 9 is thus in the final state pressed by the retaining element 12 in the direction of the lens 6 and preferably held in a position which is perpendicular to the longitudinal axis 15. By means of the opening edging element 65 also provision is made for axial tolerance in the assembly of the housing lid 13 with the retaining element 12. Thus, in the area of the opening edging element 65 the retaining element 12 in the axial direction springs so far in the direction of the lens 6 as it is required for the envisaged final state of the housing 8 and the housing lid 13. Thus, in particular by the spring force of the retaining element 12 exerted in the area of the opening edging element 65 in the final state, the permanent pressure is applied to the first circuit board 9.

Figure 5:
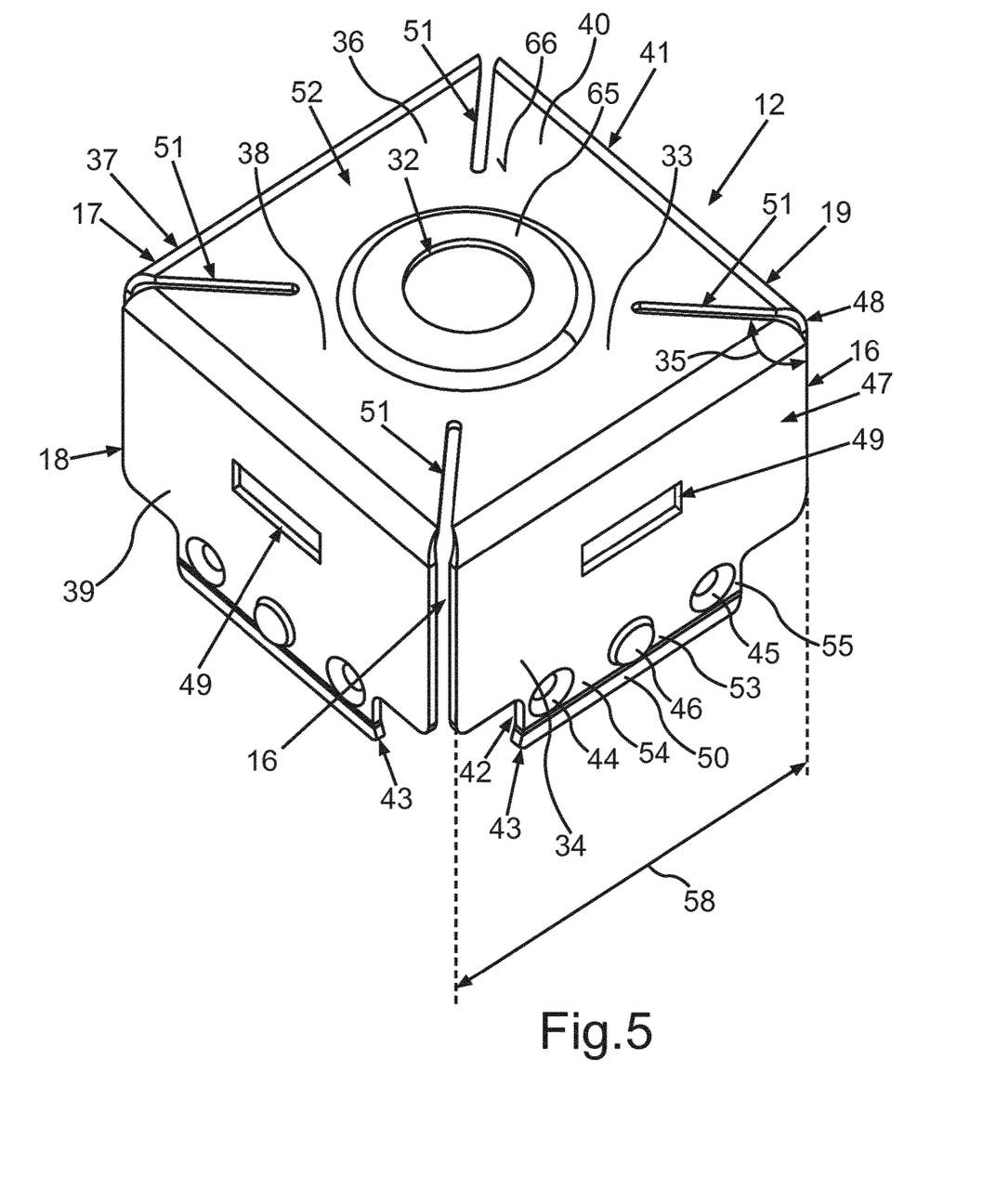
FIG. 5 a schematic illustration of the retaining element with retaining flaps.

FIG. 5 shows the retaining element 12, which is integrally and hood-like formed. The first, integral retaining flap 16 has a first retaining flap part 33 and a second retaining flap part 34. The first retaining flap part 33 is oriented at an angle 35, in particular 90°, to the second retaining flap part 34. Analogously to the first retaining flap 16, the second integral retaining flap 17 has a first retaining flap part 36 and a second retaining flap part 37. The third integral retaining flap 18 has a first retaining flap part 38 and a second retaining flap part 39. The fourth integral retaining flap 19 has a first retaining flap part 40 and a second retaining flap part 41.

In the following, the retaining flaps 16, 17, 18, 19 are exemplarily described by way of the configuration of the first retaining flap 16. For the description of the second retaining flap 17, the third retaining flap 18 and the fourth retaining flap 19, the description of the first retaining flap 16 can be used in analogous manner. Thus, the first retaining flap 16 has a coupling area 42 in the second retaining flap part 34. The coupling area 42 is integrally formed at an end or edge facing away from the first retaining flap part 33. In the coupling area 42, a coupling tongue 43 is disposed, which substantially extends downwards in the plane of the second retaining flap part 34. In the coupling area 42, the retaining element 12 is contacted by the first circuit board 9 in the assembled final state of the camera 2. The coupling tongue 43 has a first inner knob 44 and a second inner knob 45. The inner knobs 44, 45 therefore extend on an inner side of the second retaining flap part 34 of the retaining flap 16 facing the opposing second retaining flap part 37 in raised manner towards this second retaining flap part 37. Furthermore, the coupling tongue 43 has an outer knob 46. It extends in raised manner to the outside and thus in the opposite direction to the inner knobs 44, 45. The inner knobs 44, 45 abut on the first border side 20 in the assembled final state of the camera 2. The outer knob 46 abuts on the inner side 28 of the first sidewall 24 in the assembled final state of the camera 2.

The first retaining flap 16 has a continuous recess 49 in an area 47 of the second retaining flap part 34 between a transition 48 from the first retaining flap part 36 to the second retaining flap part 37 and the coupling tongue 43. The recess 49 is provided for the arrangement of the second circuit board 10 on the retaining element 12. The second circuit board 10 extends through this recess 49 to the outside with a web.

A lower area 50 of the coupling tongue 43 is for example bent out of a plane parallel to the longitudinal axis 15 by 1° to 5° in the direction of the longitudinal axis 15. Thereby, the retaining element 12 can be easier introduced into the housing 8 in assembly.

The first retaining flap parts 33, 36, 38, 40 are disposed at least partially spaced from each other or separated by slits 51 extending to the longitudinal axis 15 such that they can spring independently of each other. Furthermore, by the first retaining flap parts 33, 36, 38, 40, a roof 52 of the retaining element 12 is formed. By the roof 52, the first circuit board 9 and the second circuit board 10 are covered.

FIG. 6 shows a further embodiment of the retaining element 12. The retaining element 12 is formed in analogous manner to FIG. 5, wherein the coupling tongue 43 has a first partial coupling tongue 53, a second partial coupling tongue 54 and a third partial coupling tongue 55. The outer knob 46 is disposed on the first partial coupling tongue 53. The first inner knob 44 is disposed on the second partial coupling tongue 54 and the second inner knob 45 is disposed on the third partial coupling tongue 55. By the separation, multiple individual claws are formed as partial coupling tongues 53, 54, 55.

The second circuit board 10 has four webs or socket elements 56, which extend through the respectively associated recess 49. The second circuit board 10 is retained in the retaining element 12 by the socket elements 56 in a defined axial position in the direction of the longitudinal axis 15.

The first partial coupling tongue 54 is in particular disposed spaced to the first border side 20. Thus, the first partial coupling tongue 53 can be pressed towards the first border side 20 by the first sidewall 24, whereby the entire first retaining flap 16 is pressed in the direction of the longitudinal axis 15. The second partial coupling tongue 54 and the third partial coupling tongue 55 are bent away from the longitudinal axis 15 upon contact with the first border side 20 and further pressure from the first sidewall 24 on the outer knob 46 and thus a tolerance for receiving the first circuit board 9 in the retaining element 12 is provided.

Figure 7:
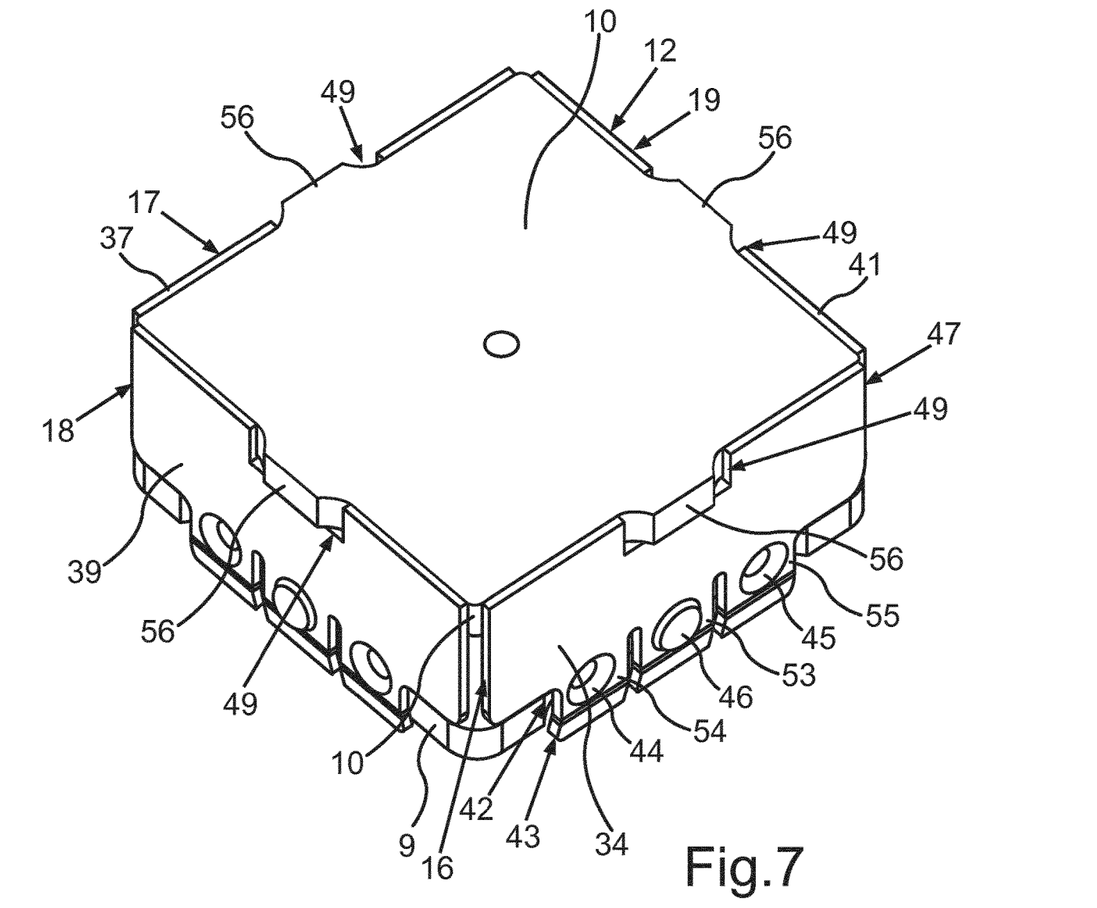
FIG. 7 a schematic sectional representation of the retaining element and a second circuit board of the camera.

FIG. 7 shows the retaining element 12 sectioned in the plane of the second circuit board 10. It is shown that the second circuit board 10 is disposed in the recesses 49 with the socket elements 56. In an embodiment not further shown in the figures, the recesses are expanded with elastic clamps such that pressure is exerted on the second circuit board 10 in the direction of the longitudinal axis 15. The clamps can for example be disposed on a longitudinal side of the recess 49 or else be disposed on both longitudinal sides of the recess 49. In particular, the second circuit board 10 is inserted into the retaining element 12 in a step before the first circuit board 9 in the assembly of the camera 2.

Figure 8:
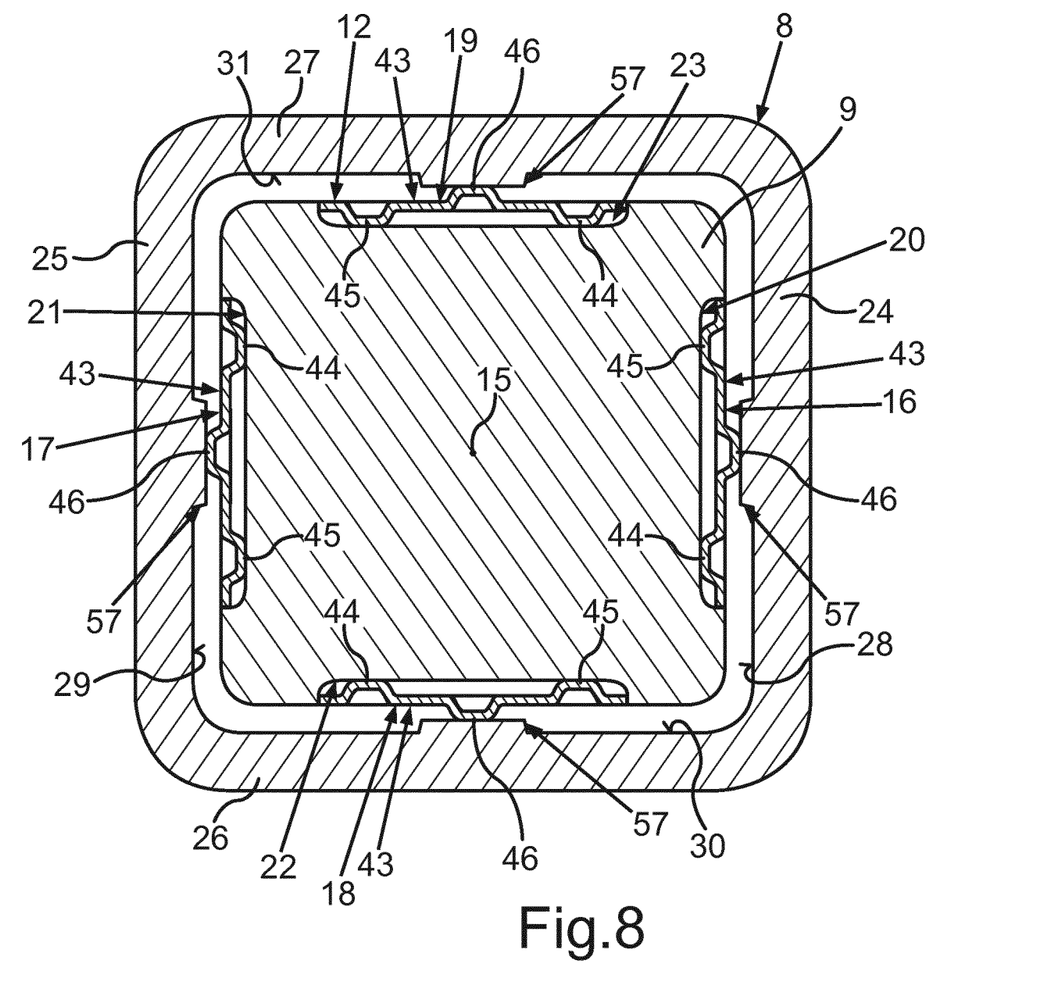
FIG. 8 a schematic sectional representation of the retaining element in plan view.

FIG. 8 shows the retaining element 12 in a sectioned plan view. The section extends through a plane extending centrally through the first circuit board 9 and perpendicularly to the longitudinal axis 15 in the assembled final state of the camera 2. Of the sectioned retaining element 12, the coupling tongues 43 with the inner knobs 44, 45 and the outer knob 46 are shown. The sectioned retaining element 12 is disposed in the also sectioned housing 8. The respective outer knobs 46 each abut on a ramp 57 of the housing 8. The ramps 57 are disposed on the inner side 28 of the first sidewall 24, the inner side 29 of the second sidewall 25, the inner side 30 of the third sidewall 26 and the inner side 31 of the fourth sidewall 27.

As shown in FIG. 5, the coupling tongue 43 is shorter than an entire width 58 of the first retaining flap 16.

Figure 9:
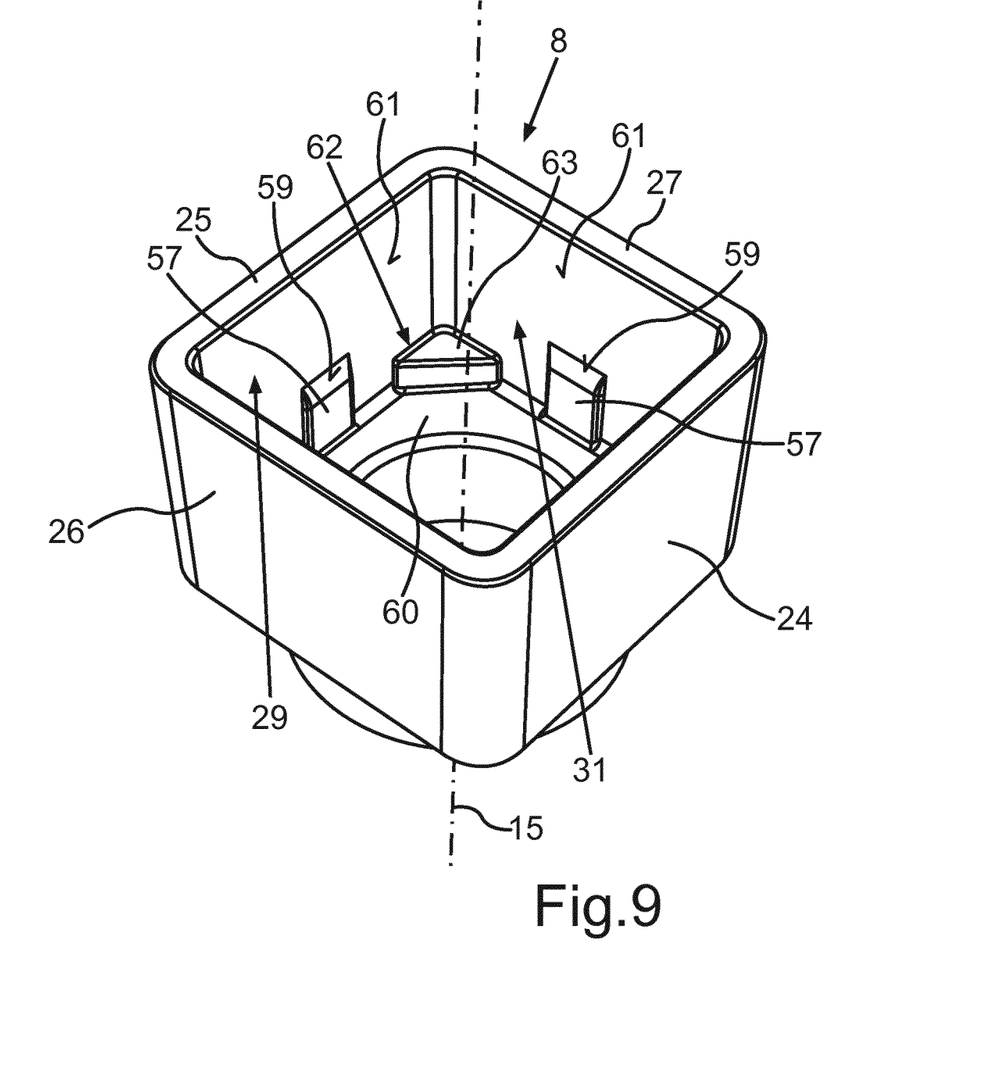
FIG. 9 a schematic representation of the housing with ramps and bearing pedestals.

FIG. 9 shows the integral housing 8 of the camera 2. The ramp 57 is each disposed on the inner side 28 of the first sidewall 24, the inner side 29 of the second sidewall 25, the inner side 30 of the third sidewall 26 and the inner side 31 of the fourth sidewall 27. The ramps 57 each have a lead-in surface 59 facing the receiving opening of the housing 8. The lead-in surface 59 is directed away from a bottom 60 of the housing 8 in tapering manner. By the lead-in surface 59, the outer knob 46 can be simpler and thus continuously axially immerse into the housing without cant and be led onto the ramp 57. The ramps 57 are formed raised with respect to a main inner surface 61 of the respective sidewall 24, 25, 26, 27. Thereby, by the axial movement of the retaining element 12 from the contact with the ramp 57, pressing in of the retaining flaps 16, 17, 18, 19 perpendicularly to the longitudinal axis 15 is automatically effected and thereby pressing of the retaining flaps 16, 17, 18, 19 to the border sides 20, 21, 22, 23 is generated.

In corner areas 62 of the bottom 60 of the housing 8, bearing pedestals 63 are disposed. The bearing pedestals 63 serve for bearing the first circuit board 9 in the assembled final state of the camera 2. The bearing pedestals 63 can for example have a triangular contour viewed in top view. The bearing pedestals 63 are formed such that they are also partially disposed on the respective sidewall 24, 25, 26, 27 in addition to the arrangement on the bottom 60.

Figure 10:
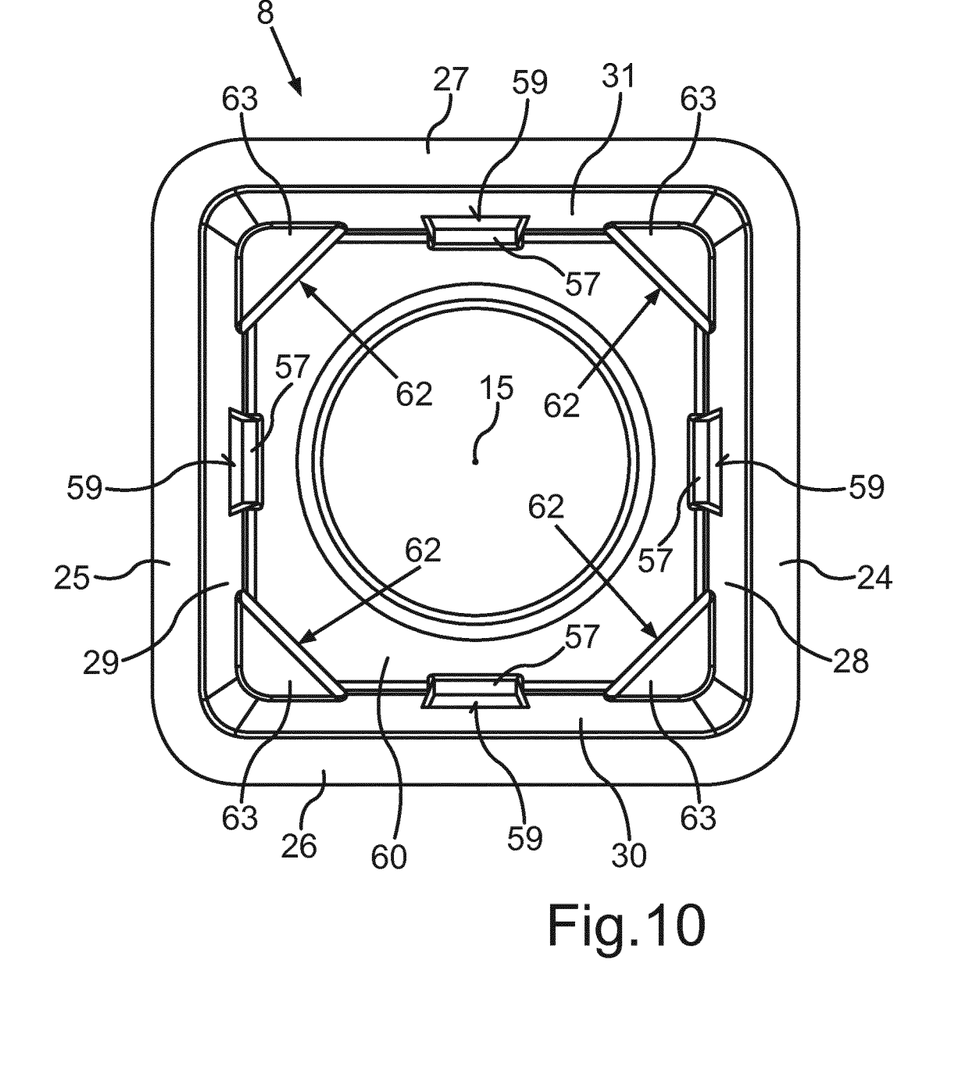
FIG. 10 a schematic plan view of a bottom of the housing with bearing pedestals disposed in a corner area of the bottom.

FIG. 10 shows the housing 8 in analogous manner to FIG. 9 in a plan view. The ramps 57 and the bearing pedestals 63 are shown.

Figure 11:
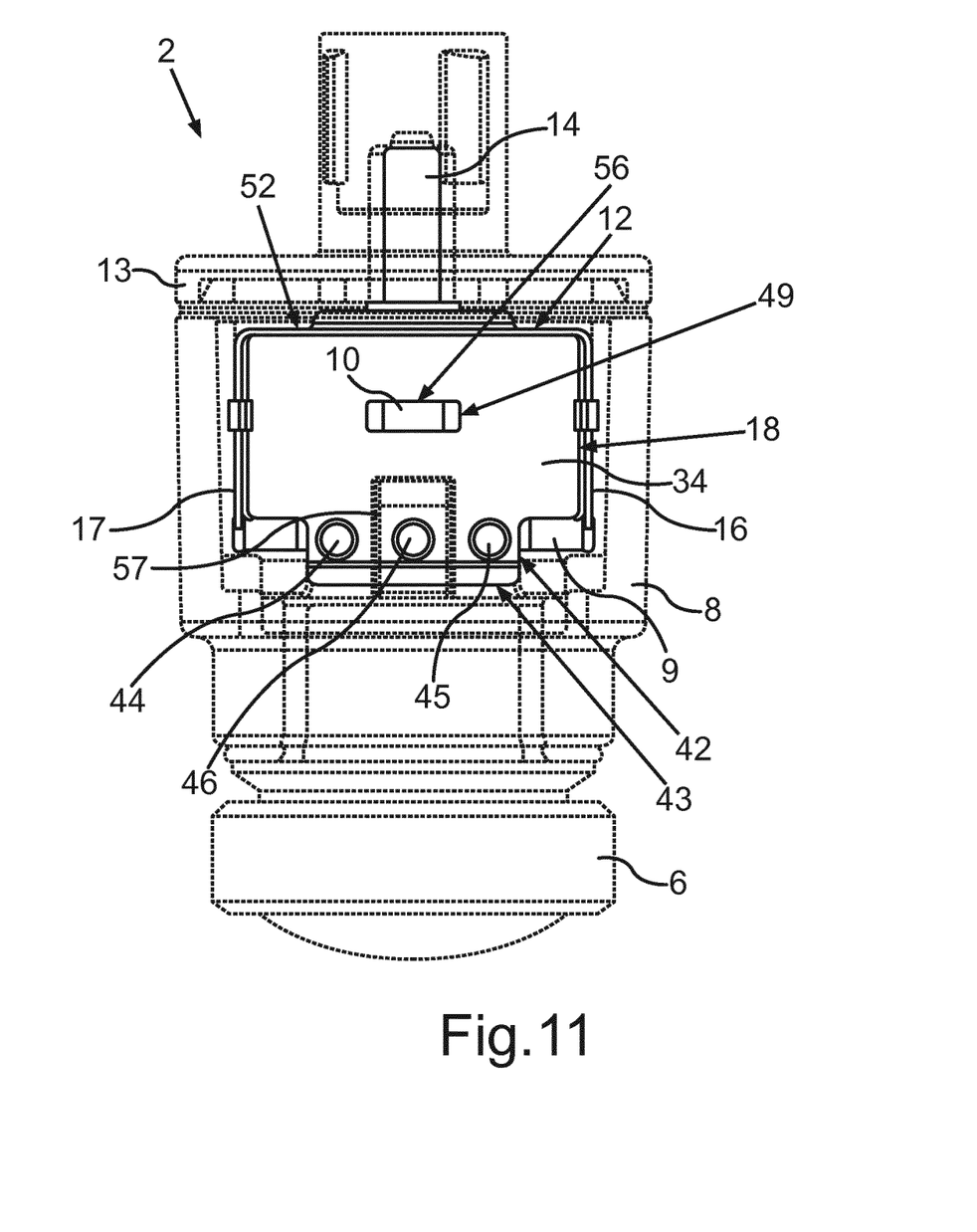
FIG. 11 a schematic lateral partial sectional representation of the camera assembled in the final state.

FIG. 11 shows a sectional representation of the camera 2 in the assembled final state. The retaining element 12 is disposed in the housing 8 together with the first circuit board 9 and the second circuit board 10. By the respective inner side 28, 29, 30, 31 of the respective sidewall 24, 25, 26, 27 of the housing 8, pressure is exerted on the respective retaining flap 16, 17, 18, 19 towards the longitudinal axis 15, and the first circuit board 9 is thereby retained on the respective border side 20, 21, 22, 23.

Figure 12:
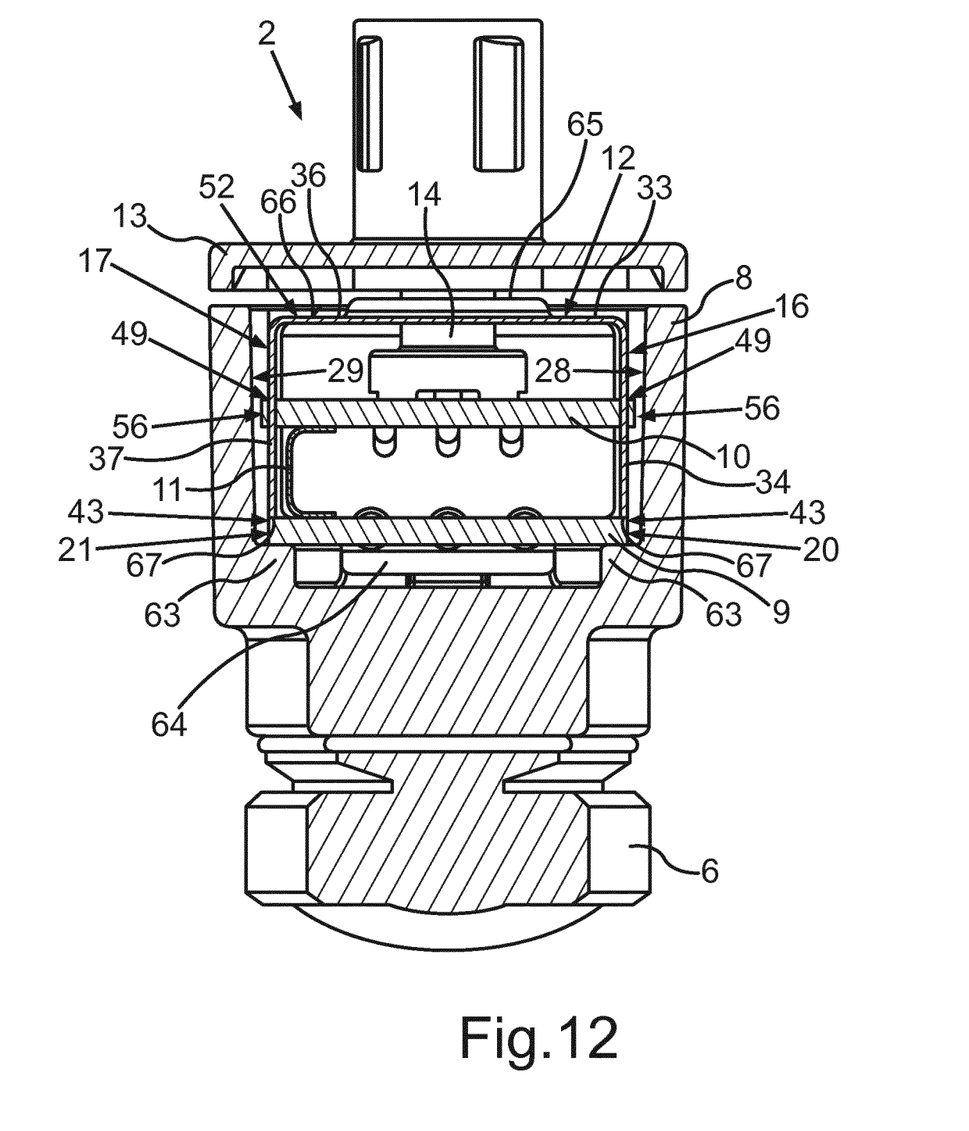
FIG. 12 a further schematic sectional representation of the camera assembled in the final state.

FIG. 12 shows a further sectional representation of the camera 2 in the assembled final state in analogous manner to FIG. 11, wherein the retaining element 12 is now also sectioned represented. An image sensor 64 of the camera 2 is disposed on the first circuit board 9. The first circuit board 9 is electrically connected to the second circuit board 10 via the connecting element 11. The retaining element 12 is preferably formed of spring steel. However, the retaining element 12 can also be formed of another material, which is preferably constituted in electromagnetically shielding, conductive and resilient manner. Thus, electromagnetic shielding of the first circuit board 9 and/or the second circuit board 10 can also be provided by the retaining element 12. The camera 2 can for example also include at least a further third circuit board, which can then for example also be retained by the retaining element 12. The housing 8 is for example formed of plastic.

In consequence of the housing lid 13 being pressed onto the opening edging element 65 as described in FIG. 4, the retaining element 12 with a front side 67 of the respective retaining flap 16, 17, 18, 19, which faces the first circuit board 9, is pressed onto the first circuit board 9 in the axial direction. Thus, the first circuit board 9 is pressed onto the bearing pedestals 63 in the direction of the lens 6 and preferably oriented perpendicularly to the longitudinal axis 15 or held in a position perpendicularly aligned to the longitudinal axis 15.

The invention claimed is:

1. A camera for a motor vehicle comprising:
   a housing;
   a first circuit board; and
   a retaining element by which the circuit board is retained in the housing, wherein the retaining element has a first retaining flap resilient in a direction perpendicular to a longitudinal axis of a base of the housing, and a second retaining flap resilient in the direction perpendicular to the longitudinal axis, which engage with opposing border sides of the first circuit board,
   wherein the first retaining flap is pressed to a first border side of the first circuit board by an inner side of a first sidewall of the housing in perpendicular direction to the longitudinal axis in an assembled final state of the camera, and the second retaining flap is pressed to a second border side of the first circuit board by an inner side of a second sidewall of the housing in perpendicular direction to the longitudinal axis in the assembled final state of the camera,
   wherein a respective retaining flap has a coupling tongue in a coupling area of a second retaining flap part of the respective retaining flap for coupling to the first circuit board, and
   wherein the second retaining flap part of the respective retaining flap has a continuous recess for the arrangement of a second circuit board of the camera in an area between a transition from a first retaining flap part of the respective retaining flap to the second retaining flap part and the coupling tongue of the respective retaining flap.

2. The camera according to claim 1, wherein the retaining element has a third retaining flap resilient in the direction perpendicular to the longitudinal axis and a fourth retaining flap resilient in the direction perpendicular to the longitudinal axis, which engage with opposing border sides of the first circuit board, wherein the third retaining flap is pressed to a third border side of the first circuit board by an inner side of a third sidewall of the housing in perpendicular direction to the longitudinal axis in the assembled final state of the camera, and the fourth retaining flap is pressed to a fourth border side of the first circuit board by an inner side of a fourth sidewall of the housing in perpendicular direction to the longitudinal axis in the assembled final state of the camera.

3. The camera according to claim 1, wherein the first retaining flap has a first retaining flap part and a second retaining flap part and/or the second retaining flap has a first retaining flap part and a second retaining flap part, wherein the retaining flap parts join each other at a right angle.

4. The camera according to claim 1, wherein the entire retaining element is integrally hood-like, formed with at least the first retaining flap and the second retaining flap.

5. The camera according to claim 1, wherein the coupling tongue has at least an inner knob, which faces the first circuit board, and/or the coupling tongue has an outer knob, which faces the inner side of the respective sidewall of the housing.

6. The camera according to claim 5, wherein the coupling tongue includes a first partial coupling tongue with the outer knob and at least a second partial coupling tongue with the inner knob spaced thereto.

7. The camera according to claim 1, wherein the coupling tongue is shorter than an entire width of the retaining flap extending in a plane perpendicular to the longitudinal axis, wherein the coupling tongue is centrally disposed in the middle on the retaining flap.

8. The camera according to claim 1, wherein the second circuit board has a socket element for arrangement in the recess centrally on at least one border side.

9. The camera according to claim 1, wherein a roof of the retaining element formed for covering the at least first circuit board is formed by at least a first retaining flap part of the first retaining flap and a first retaining flap part of the second retaining flap.

10. The camera according to claim 1, wherein on an inner side of a respective sidewall of the housing, a ramp raised with respect to a main inner surface of the sidewall is formed, wherein the ramp has a lead-in surface directed away from a bottom of the housing in tapering manner.

11. The camera according to claim 1, wherein in a corner area of a bottom, a bearing pedestal for bearing the first circuit board is formed.

12. A motor vehicle with a camera according to claim 1.

13. A method for assembling a camera, comprising:
   retaining a first circuit board of the camera by a retaining element of the camera in a housing of the camera;
   in passing the retaining element and the housing into each other, causing a first retaining flap and a second retaining flap of the retaining element to spring in a direction perpendicular to a longitudinal axis of a base of the housing; and
   engaging opposing border sides of the first circuit board by the resilient retaining flaps,
   wherein the first retaining flap is pressed to a first border side of the first circuit board by an inner side of a first sidewall of the housing in perpendicular direction to the longitudinal axis in this passing into each other, and the second retaining flap is pressed to a second border side of the first circuit board by an inner side of a second sidewall of the housing in perpendicular direction to the longitudinal axis in this passing into each other,
   wherein the respective retaining flap has a coupling tongue in a coupling area of a second retaining flap part of the respective retaining flap for coupling to the first circuit board, and
   wherein a second retaining flap part of the respective retaining flap has a continuous recess for the arrangement of a second circuit board of the camera in an area between a transition from a first retaining flap part of the respective retaining flap to the second retaining flap part and the coupling tongue of the respective retaining flap.

* * * * *